(12) United States Patent
Hendrickson et al.

(10) Patent No.: US 7,449,263 B1
(45) Date of Patent: Nov. 11, 2008

(54) PHOSPHATE-FREE ELECTROLYTE FOR RECHARGEABLE LITHIUM ION CELLS

(75) Inventors: Mary A. Hendrickson, Forked River, NJ (US); Edward J. Plichta, Howell, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 748 days.

(21) Appl. No.: 11/058,711

(22) Filed: Feb. 14, 2005

(51) Int. Cl.
*H01M 6/16* (2006.01)
(52) U.S. Cl. .................................. 429/322; 429/326
(58) Field of Classification Search ............... 252/62.2; 429/322
See application file for complete search history.

(56) References Cited

U.S. PATENT DOCUMENTS

2005/0023153 A1* 2/2005 Bakker et al. ............... 205/775

FOREIGN PATENT DOCUMENTS

JP 02069651 A * 3/1990

* cited by examiner

*Primary Examiner*—Gregg Cantelmo
(74) *Attorney, Agent, or Firm*—Michael Zelenka; George B. Tereschuk

(57) ABSTRACT

A more efficient $LiPF_6$ lithium-ion electrochemical system composed of a phosphate free, borate lithium salt electrolyte LiTPTB composed of $LiBC_{32}F_{24}H_{12}$ in a ternary mixed organic solvent containing a 1:1:1 volume ratio of EC, DMC and EMC is provided. The borate salt of the LiTPTB electrolyte decomposes at temperatures above 110° C. and does not react with water and also has an oxidation potential of about 4.4 V versus lithium, making it suitable for use in high voltage lithium-ion cells and batteries. A 0.3 to 1.0 M molar concentration of LiTPTB composed of $LiBC_{32}F_{24}H_{12}$ in a ternary mixed organic solvent containing a 1:1:1 volume ratio of EC, DMC and EMC is also provided.

17 Claims, 1 Drawing Sheet

PHOSPHATE-FREE ELECTROLYTE FOR RECHARGEABLE LITHIUM ION CELLS

GOVERNMENT INTEREST

The invention described herein may be manufactured, used, imported, sold, and licensed by or for the Government of the United States of America without the payment to us of any royalty thereon.

FIELD OF THE INVENTION

The invention relates generally to the field of lithium electrochemical power sources. In particular, the present invention relates to a phosphate free borate lithium salt electrolyte for lithium-ion electrochemical systems.

BACKGROUND OF THE INVENTION

Presently, both military and civilian users of electronic equipment require the use of rechargeable lithium-ion batteries to provide power to numerous portable electronic devices such as cellular telephones, laptop computers, communication systems and digital instruments at an ever-increasing pace. Lithium-ion batteries provide a much-needed source of power for portable electrically operated devices, but they also pose a number of drawbacks and problems.

The typical lithium-ion battery is composed of an anode, or negative electrode, of graphite and a cathode, or positive electrode, usually made from a transition metal oxide or sulfide compound. Rechargeable lithium-ion batteries typically use electrolytes containing a lithium salt dissolved in an organic solvent. Prior art mixed organic solvent electrolytes were developed using lithium salts dissolved in mixtures of a high dielectric constant solvents, such as Ethylene Carbonate ("EC") and Propylene Carbonate ("PC"), with various volume ratios of low viscosity ester solvents such as Diethyl Carbonate ("DC") and dimethyl carbonate ("DMC"). The lithium salt of choice for these electrolyte solutions has been Lithium Hexafluorophosphate, $LiPF_6$, because $LiPF_6$ provides a high specific ionic conductivity and possesses wide electrochemical stability over the high operating voltage range of lithium-ion cells of about 2.5 V to 4.3 V as compared with lithium, but $LiPF_6$ suffers from a number of disadvantages, shortcomings and limitations.

One significant problem with $LiPF_6$ in the electrolyte solution is that it reacts with trace water present in the cells to produce hydrofluoric acid and other reaction products that react with the solvents to produce more water, resulting in an overall continued decomposition of the salt. Another serious limitation with $LiPF_6$ in the electrolyte is that it thermally decomposes at moderately low temperatures of about 65° C. and the reaction is accelerated at higher temperatures and even more rapid at temperatures above 65° C. The result is a significant loss of battery performance due to reduced cell capacity and poor cycle life. These two drawbacks of reactivity with trace water and low temperature thermal decomposition significantly limit the use and performance of lithium-ion cells and batteries containing $LiPF_6$ in higher temperature environments. Thus there has been a long-felt need for $LiPF_6$ lithium-ion cells and batteries that do not decompose in the presence of water and have a higher temperature of stability, thereby eliminating the hydrofluoric acid reaction products that typically degrade cell performance, without suffering from the disadvantages, shortcomings and limitations of prior art electrochemical systems.

Up until now there has been no $LiPF_6$ salt that does not suffer from the disadvantages, limitations, drawbacks and shortcomings of $LiPF_6$ electrolytes for lithium-ion cells and batteries of trace water reactivity and low temperature thermal decomposition. The present inventors have discovered a new phosphate free, borate lithium salt electrolyte composed of Lithium tetra-phenyl-3,5 trifluoromethyl borate, having the formula $LiBC_{32}F_{24}H_{12}$, hereinafter referred to as LiTPTB, in a ternary mixed organic solvent containing a 1:1:1 volume ratio of EC, DMC, and EMC that provides substantially improved cell performance for use in electrolytes for lithium-ion cells and batteries.

SUMMARY OF THE INVENTION

It is an object of the present invention to provide a phosphate free, borate lithium salt electrolyte.

It is another object of the present invention to provide a phosphate free, borate lithium salt electrolyte LiTPTB composed of lithium tetra-phenyl-3,5 trifluoromethyl borate, $LiBC_{32}F_{24}H_{12}$.

It is still a further object of the present invention to provide a phosphate free, borate lithium salt electrolyte LITPTB composed of $LiBC_{32}F_{24}H_{12}$, that provides substantially improved cell performance characteristics for use in electrolytes for lithium-ion cells and batteries.

To achieve the aforementioned objects and advantages and satisfy the long-felt needs for a more efficient $LiPF_6$ lithium-ion battery, the present invention provides a phosphate free, borate lithium salt electrolyte LiTPTB composed of $LiBC_{32}F_{24}H_{12}$ in a ternary mixed organic solvent containing a 1:1:1 volume ratio of EC, DMC and EMC. The borate salt of the LiTPTB electrolyte decomposes at temperatures above 110° C. and does not react with water and also has an oxidation potential of about 4.4 V versus lithium, making it suitable for use in high voltage lithium-ion cells and batteries. Another embodiment of the present invention provides a phosphate free, borate lithium salt electrolyte using an 0.3 to 1.0 M molar concentration of LiTPTB composed of $LiBC_{32}F_{24}H_{12}$ in a ternary mixed organic solvent containing a 1:1:1 volume ratio of EC, DMC and EMC.

This invention's LiTPTB compounds satisfy the long-felt need for a $LiPF_6$ phosphate free borate lithium salt electrolyte providing substantially improved cell performance without trace water reactivity with $LiPF_6$ lithium-ion cells and batteries that do not decompose in the presence of water and have a higher temperature of stability, thereby eliminating the hydrofluoric acid reaction products that typically degraded cell performance of prior art batteries. The present invention contemplates lithium salt electrolytes and lithium ion electrochemical systems, such as lithium ion batteries, with a phosphate free, borate lithium salt electrolyte LiTPTB composed of Lithium tetra-phenyl-3,5 trifluoromethyl borate, $LiBC_{32}F_{24}H_{12}$.

DETAILED DESCRIPTION OF THE DRAWINGS

Figure 1:
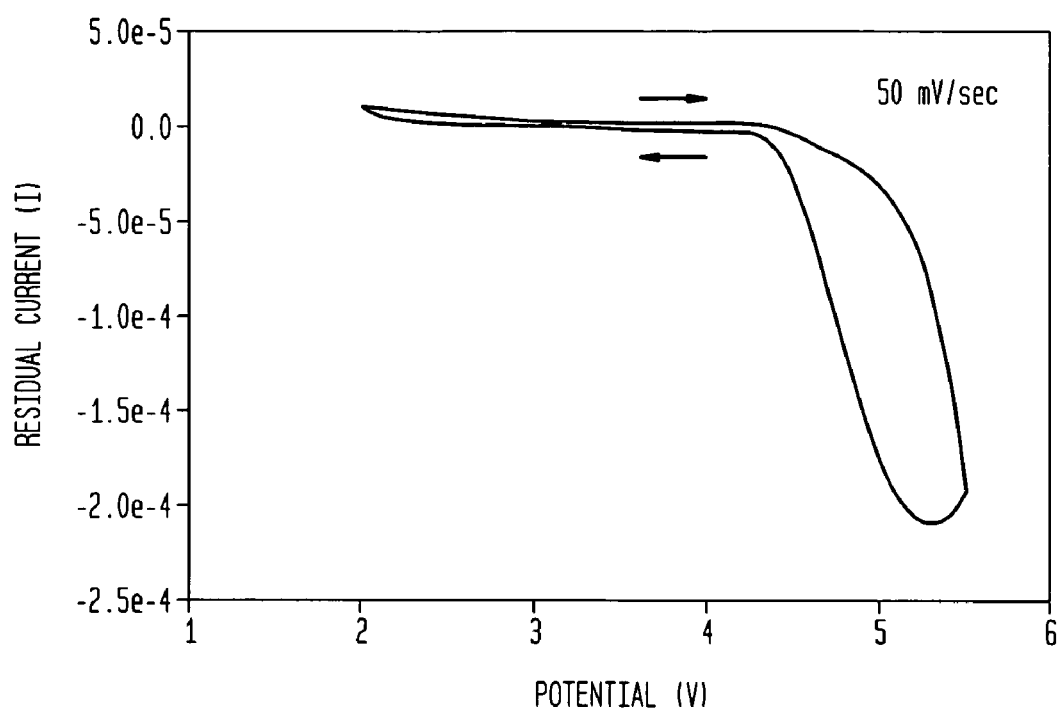
FIG. 1 is a chart depicting the cyclic voltammogram oxidation sweep of 0.3 M LiTPTB in 1:1:1 volume ratio of EC:DMC:EMC.

The phosphate free, borate lithium salt electrolyte of the present invention comprises lithium tetra-phenyl-3,5 trifluoromethyl borate, $LiBC_{32}F_{24}H_{12}$, also known as LiTPTB, in a ternary mixed organic solvent containing a 1:1:1 volume ratio of EC, DMC and EMC. The inventors have discovered that the borate salt decomposes at temperatures above 110° C. and does not react with water to produce cell performance degrading acid products. The $LiBC_{32}H_{24}H_{12}$ electrolyte formula also has an oxidation potential of about 4.4 V versus lithium, making it suitable for use in high voltage lithium-ion cells and batteries. A preferred embodiment of this compound is a 0.3 to 1.0 M (molar concentration) of LiTPTB, in a ternary mixed organic solvent containing a 1:1:1 volume ratio of EC, DMC and EMC as the electrolyte solution in a lithium-ion electrochemical cell. In this preferred embodiment, the 0.3 M LiTPTB in 1:1:1 EC:DMC:EMC measured at 1 KHz at 25° C. achieved a specific conductivity of 3.46 mS/cm². Referring now to the drawings, FIG. 1 charts the cyclic voltammogram oxidation sweep of 0.3 M LiTPTB in 1:1:1 volume ratio of EC:DMC:EMC at a 0.125 inch diameter glassy carbon working electrode versus lithium at a scan rate of 50 mV/sec. The voltammogram was performed by sweeping the potential from the cell open circuit potential to 5.5 V versus lithium. These results show the electrolyte having a stable oxidation potential to about 4.4 V versus lithium.

The LiTPTB batteries and cells of the present invention may be fabricated by combining two intermediate salt or solvent solutions that precipitate the desired salt from the solution, and then re-crystallizing the salt to synthesize the desired salt.

EXAMPLE

Figure 2:
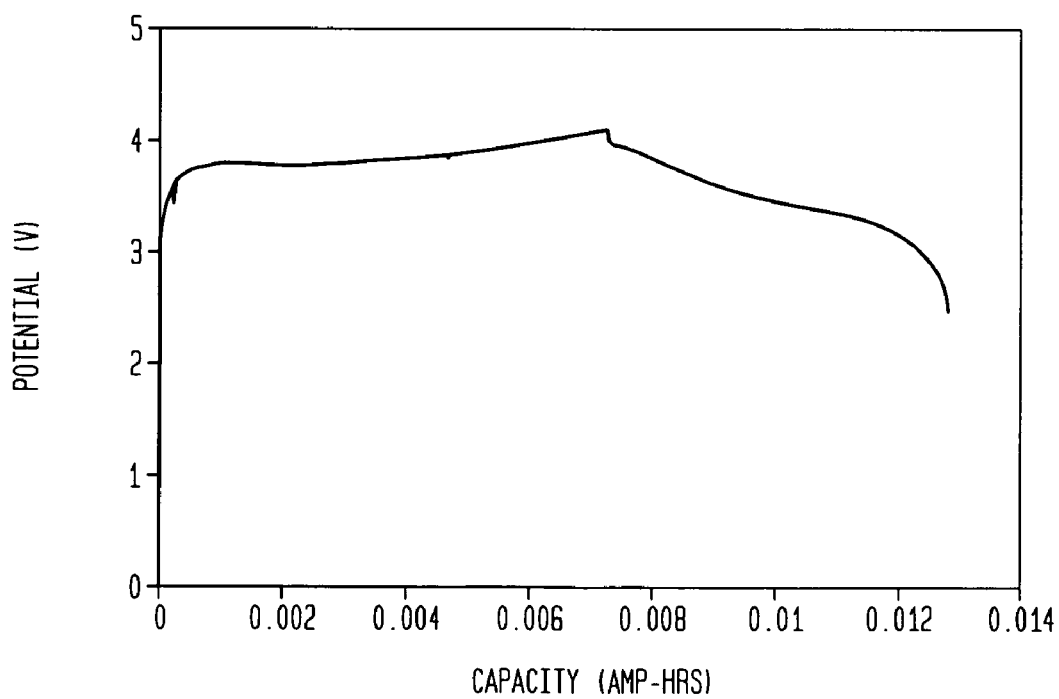
FIG. 2 is a chart depicting a typical charge/discharge cycle of a lithium-ion cell containing 0.3 M LiTPTB in 1:1:1 volume ratio of EC:DMC:EMC.

In one example, a lithium ion electrochemical cell was constructed with a graphite anode and a lithium nickel cobalt oxide, $LiNi_{0.2}Co_{0.8}O_2$ cathode. A layer of Celgard 2300 micro-porous polymer separator film separated the electrodes electrically. The electrolyte was 0.3 M LiTPTB in 1:1:1 EC:DMC:EMC. FIG. 2 is a chart depicting a typical charge/discharge cycle illustrating a typical charge/discharge cycle of that lithium-ion cell. The cell was cycled using a MACOR test system at 0.5 mA/cm² between 2.5 and 4.1 volts at 25° C. The cell performance shows excellent reversible cycle life behavior for the electrolyte.

The molar concentration range is dependent upon the solubility of the salt in the solvent. In organic solvents, the salts will generally be limited to about a 3M maximum before salt can no longer remain dissolved in the solution.

It is to be understood that although specific molar salt solutions were demonstrated that higher or lower concentration of salt could be used to optimize the solution conductivity and cell performance. Though the solutions were demonstrated in rechargeable lithium-ion electrochemical cells it is to be understood that the same solutions could be used in other electrochemical cells both as rechargeable and/or primary cells containing other electrode chemistries of lithium compounds, lithium ion, lithium alloys, and lithium polymers.

It is to be understood that such other features and modifications to the foregoing detailed description are within the contemplation of the invention, which is not limited by this description. As will be further appreciated by those skilled in the art, any number of configurations, as well any number of combinations of differing materials and dimensions can achieve the results described herein. Accordingly, the present invention should not be limited by the foregoing description, but only by the appended claims.

We claim:

1. An electrolyte for a lithium ion electrochemical system, comprising:
   a lithium tetra-phenyl-3,5 trifluoromethyl borate, having the formula, $LiBC_{32}F_{24}H_{12}$;
   said electrolyte being dissolved in a ternary mixed organic solvent containing a 1:1:1 volume ratio of Ethylene Carbonate, Dimethyl Carbonate and Methyl Ethyl Carbonate;
   said electrolyte being phosphate free and having a borate salt;
   said borate salt decomposing at a temperature greater than or equal to 110° C. and not reacting with water to prevent producing a plurality of degrading acid products and a stable oxidation potential causing said system to exhibit a stable oxidation potential and a reversible cycle life behavior.

2. The electrolyte for the lithium ion electrochemical system, as recited in claim 1, further comprising said stable oxidation potential being in a range of about 4.4 V to 5.5 V.

3. The electrolyte for the lithium ion electrochemical system, as recited in claim 2, further comprising said electrolyte having a 0.3 to 1.0 M molar concentration.

4. The electrolyte for the lithium ion electrochemical system, as recited in claim 3, further comprising achieving a specific conductivity of at least 3.46 mS/cm² measured at 1 KHz at 25° C.

5. The electrolyte for the lithium ion electrochemical system, as recited in claim 4, further comprising said lithium ion electrochemical system being a rechargeable lithium ion battery cell.

6. An lithium ion electrochemical system, comprising:
   an anode;
   a cathode;
   an electrolyte composed of lithium tetra-phenyl-3,5 trifluoromethyl borate, having the formula, $LiBC_{32}F_{24}H_{12}$;
   said electrolyte being dissolved in a ternary mixed organic solvent containing a 1:1:1 volume ratio of Ethylene Carbonate, Dimethyl Carbonate and Methyl Ethyl Carbonate;
   said electrolyte being phosphate free and having a borate salt;
   said borate salt decomposing at a temperature greater than or equal to 110° C. and not reacting with water to prevent producing a plurality of degrading acid products and a stable oxidation potential causing said system to exhibit a stable oxidation potential and a reversible cycle life behavior.

7. The lithium ion electrochemical system, as recited in claim 6, further comprising said stable oxidation potential being in a range of about 4.4 V to 5.5 V.

8. The lithium ion electrochemical system, as recited in claim 7, further comprising said electrolyte having a 0.3 to 1.0 M molar concentration.

9. The lithium ion electrochemical system, as recited in claim 8, further comprising achieving a specific conductivity of at least 3.46 mS/cm² measured at 1 KHz at 25° C.

10. The lithium ion electrochemical system, as recited in claim 9, further comprising said lithium ion electrochemical system being a rechargeable lithium ion battery cell.

11. A rechargeable lithium ion battery cell, comprising:
    an anode;
    a cathode;

an electrolyte composed of lithium tetra-phenyl-3,5 trifluoromethyl borate, having the formula, $LiBC_{32}F_{24}H_{12}$;

said electrolyte being dissolved in a ternary mixed organic solvent containing a 1:1:1 volume ratio of Ethylene Carbonate, Dimethyl Carbonate and Methyl Ethyl Carbonate;

said electrolyte being phosphate free and having a borate salt;

said borate salt decomposing at a temperature greater than or equal to 110° C. and not reacting with water to prevent producing a plurality of degrading acid products causing said cell to exhibit a stable oxidation potential and a reversible cycle life behavior.

12. The rechargeable lithium ion battery cell, as recited in claim 11, further comprising said stable oxidation potential being in a range of about 4.4 V to 5.5 V.

13. The rechargeable lithium ion battery cell, as recited in claim 12, further comprising said electrolyte having a 0.3 to 1.0 M molar concentration.

14. The rechargeable lithium ion battery cell, as recited in claim 13, further comprising achieving a specific conductivity of at least 3.46 mS/cm$^2$ measured at 1 KHz at 25° C.

15. The rechargeable lithium ion battery cell, as recited in claim 14, further comprising said anode being a graphite anode.

16. The rechargeable lithium ion battery cell, as recited in claim 15, further comprising said cathode being a lithium nickel cobalt oxide cathode.

17. The rechargeable lithium ion battery cell, as recited in claim 16, further comprising said cathode being composed of a material having the formula $LiNi_{0.2}Co_{0.8}O_2$.

* * * * *